(12) United States Patent
Battlogg

(10) Patent No.: US 11,231,780 B2
(45) Date of Patent: Jan. 25, 2022

(54) HAPTIC OPERATING DEVICE FOR A MOTOR VEHICLE

(71) Applicant: INVENTUS ENGINEERING GMBH, St. Anton I.M. (AT)

(72) Inventor: Stefan Battlogg, St. Anton I. M. (AT)

(73) Assignee: Inventus Engineering GmbH, St. Anton i.M. (AT)

(*) Notice: Subject to any disclaimer, the term of this patent is extended or adjusted under 35 U.S.C. 154(b) by 39 days.

(21) Appl. No.: 16/615,170

(22) PCT Filed: May 18, 2018

(86) PCT No.: PCT/EP2018/063155
§ 371 (c)(1),
(2) Date: Nov. 20, 2019

(87) PCT Pub. No.: WO2018/215353
PCT Pub. Date: Nov. 29, 2018

(65) Prior Publication Data
US 2020/0171949 A1    Jun. 4, 2020

(30) Foreign Application Priority Data

May 20, 2017   (DE) .......................... 10 2017 111 031

(51) Int. Cl.
*B60K 35/00*   (2006.01)
*G06F 3/01*    (2006.01)
(Continued)

(52) U.S. Cl.
CPC .............. *G06F 3/016* (2013.01); *B60K 35/00* (2013.01); *B60R 11/04* (2013.01); *G05G 1/015* (2013.01);
(Continued)

(58) Field of Classification Search
CPC ...... G06F 3/016; G06F 3/0362; G06F 3/0202; B60R 11/04; H01F 1/447; G05G 1/10;
(Continued)

(56) References Cited

U.S. PATENT DOCUMENTS 5,161,422 A * 11/1992 Suman ................... B60K 20/04
                                                      74/335
7,971,498 B2 * 7/2011 Meyer ..................... F16H 59/08
                                                      74/10.41
(Continued)

FOREIGN PATENT DOCUMENTS

DE        102011003277 A1    8/2011
DE        102012017423 A1    3/2014
(Continued)

*Primary Examiner* — Christopher E Leiby
(74) *Attorney, Agent, or Firm* — Laurence A. Greenberg; Werner H. Stemer; Ralph E. Locher

(57) ABSTRACT

A haptic operating device for a motor vehicle has a base, a stationary central part connected thereto, a rotary knob which can be rotated about the stationary central part and which has a hollow design. A magnetorheological transmission device influences the rotational movement of the rotary knob in a controlled manner. The transmission device has two components which can be rotated relative to each other and one component of which is designed as a brake component that can be rotated relative to the base. The stationary central part is secured to the base by means of a support arm. The transmission device and the support arm are arranged adjacent each other and both are received radially within the rotary knob. The rotary knob is rotationally fixed to the rotatable brake component via a coupling device.

18 Claims, 7 Drawing Sheets

(51) Int. Cl.
*G05G 1/015* (2008.04)
*G05G 1/10* (2006.01)
*G05G 5/03* (2008.04)
*H01F 1/44* (2006.01)
*B60R 11/04* (2006.01)
*G06F 3/02* (2006.01)
*G08B 6/00* (2006.01)
*G06F 3/0362* (2013.01)

(52) U.S. Cl.
CPC ................ *G05G 1/10* (2013.01); *G05G 5/03* (2013.01); *G06F 3/0202* (2013.01); *G06F 3/0362* (2013.01); *G08B 6/00* (2013.01); *H01F 1/447* (2013.01); *B60K 2370/126* (2019.05); *B60K 2370/1438* (2019.05); *B60K 2370/152* (2019.05); *G05G 2505/00* (2013.01)

(58) Field of Classification Search
CPC ............ G05G 1/015; G05G 1/08; G05G 5/03; G05G 2505/00; G08B 6/00; B60K 35/00; B60K 37/00; B60K 37/02; B60K 37/06; B60K 2370/126; B60K 2370/1438; B60K 2370/152; B60K 2370/158; A61F 2/38; F16C 1/00; F16D 37/02; F16D 57/002; F16D 2300/18; F16D 2300/0214; F16D 2037/002; F16H 59/0217; F16H 59/08; F16H 59/0204; F16H 59/044
See application file for complete search history.

(56) References Cited

U.S. PATENT DOCUMENTS

| | | | |
|---|---|---|---|
| 8,164,372 B2 * | 4/2012 | Mitsubori | H03L 7/0814 327/158 |
| 10,054,186 B2 | 8/2018 | Battlogg et al. | |
| 10,481,631 B2 | 11/2019 | Battlogg | |
| 10,845,764 B2 * | 11/2020 | Ely | G04B 37/106 |
| 10,942,538 B2 * | 3/2021 | Battlogg | G05G 1/015 |
| 2002/0057152 A1 * | 5/2002 | Elferich | G05G 1/08 335/220 |
| 2006/0033703 A1 * | 2/2006 | Olien | G06F 3/016 345/156 |
| 2006/0280575 A1 * | 12/2006 | Ruettiger | B60K 37/06 411/15 |
| 2009/0038426 A1 * | 2/2009 | Buttolo | F16H 61/24 74/473.3 |
| 2009/0107287 A1 * | 4/2009 | Seki | F16H 61/22 74/504 |
| 2010/0152980 A1 * | 6/2010 | Jones | F16F 9/53 701/49 |
| 2011/0181405 A1 * | 7/2011 | Periquet | G05G 5/03 340/407.2 |
| 2011/0205165 A1 | 8/2011 | Pfau et al. | |
| 2012/0249315 A1 * | 10/2012 | Vanhelle | B60K 37/06 340/425.5 |
| 2012/0267221 A1 * | 10/2012 | Gohng | G06F 3/0338 200/61.54 |
| 2013/0199881 A1 * | 8/2013 | Sano | F16D 65/186 188/267 |
| 2015/0159747 A1 * | 6/2015 | Hoskins | F16H 61/24 74/473.23 |
| 2016/0017983 A1 * | 1/2016 | Levesque | F16H 61/24 74/473.25 |
| 2016/0216762 A1 | 7/2016 | Vanhelle et al. | |
| 2017/0227980 A1 * | 8/2017 | Hafez | G05G 1/02 |
| 2018/0164900 A1 * | 6/2018 | Merminod | G06F 3/02 |
| 2018/0217628 A1 * | 8/2018 | Battlogg | F16D 37/02 |
| 2019/0093758 A1 * | 3/2019 | Kelly | F16H 63/42 |
| 2019/0146546 A1 * | 5/2019 | Goto | F16F 9/12 345/184 |
| 2019/0179356 A1 * | 6/2019 | Goto | F16F 9/535 |
| 2019/0203832 A1 * | 7/2019 | Heo | F16H 61/24 |
| 2019/0294248 A1 * | 9/2019 | Leroy | G06F 3/03548 |
| 2020/0174512 A1 * | 6/2020 | Battlogg | G06F 3/016 |
| 2020/0326746 A1 * | 10/2020 | Koike | G05G 5/03 |

FOREIGN PATENT DOCUMENTS

| | | |
|---|---|---|
| DE | 102013019045 A1 | 5/2015 |
| WO | 2012034697 A1 | 3/2012 |
| WO | 2017001696 A1 | 1/2017 |
| WO | 2017001697 A1 | 1/2017 |

* cited by examiner

HAPTIC OPERATING DEVICE FOR A MOTOR VEHICLE

BACKGROUND OF THE INVENTION

Field of the Invention

The present invention relates to a haptic operating device for a motor vehicle comprising a magnetorheological transfer apparatus. The haptic operating device according to the invention serves for operation of/in motor vehicles.

Magnetorheological fluids have, for example, very fine ferromagnetic particles such as, e.g., carbonyl iron powder, distributed in an oil. Spherical particles with a diameter of 1 to 10 micrometers, said diameter being due to production processes, are used in magnetorheological liquids, with the particle size not being uniform. If a magnetic field is applied to such a magnetorheological fluid, the carbonyl iron particles of the magnetorheological fluid link along the magnetic field lines such that the rheological properties of the magnetorheological fluid (MRF) are significantly influenced as a function of the form and strength of the magnetic field.

WO 2012/034697 A1 has disclosed a magnetorheological transfer apparatus comprising two couplable components, the coupling intensity of which is able to be influenced. A channel with a magnetorheological medium is provided for the purposes of influencing the coupling intensity. A magnetic field is used to influence the magnetorheological medium in the channel. Rotary bodies are provided in the channel, acute angled regions containing the magnetorheological medium being provided at said rotary bodies. The magnetic field of the magnetic field generating device is able to be applied to the channel, or at least to a part thereof, in order to selectively link the particles and wedge these with the rotary body or release these. This magnetorheological transfer apparatus can also be used at a rotary knob for operating technical appliances. Such a magnetorheological transfer apparatus works and allows relatively high forces or torques to be transferred with, at the same time, a relatively small installed size. The entirety of the disclosure of WO 2012/034697 A1 is incorporated in this application.

WO 2017/001696 A1 has disclosed a haptic operating device in which a display is disposed at an operating knob. The required power and data cables can be supplied to the display through a hollow shaft. To this end, however, the bore in the hollow shaft must have a sufficiently large diameter. A further disadvantage of a hollow shaft is that the shaft must be sealed at both ends since the apparatus for influencing the rotational movement in controlled fashion is disposed in the interior. As a result of the seals at both ends of the shafts, the number of seals increases to two, as a result of which the base friction increases. A further disadvantage lies in the fact that there is a greater seal diameter and consequently a greater friction radius as a result of the greater shaft diameter; this likewise increases the base torque by a non-negligible amount. However, a particularly low base torque is very advantageous in many applications, and often required so that the required operating force remains low "in the idle state (base torque)". Otherwise, the operator may show symptoms of fatigue. The entirety of the disclosure of WO 2017/001696 A1, too, is incorporated in this application.

SUMMARY OF THE INVENTION

It is therefore the object of the present invention to provide a haptic operating device with a magnetorheological transfer apparatus for a motor vehicle, by means of which a base torque in the idle state that is as low as possible is facilitated, with, in particular, a stationary central part being provided.

This object is achieved by a haptic operating device for a motor vehicle having the features as claimed. Preferred developments of the invention are the subject matter of the dependent claims. Further advantages and features of the present invention emerge from the general description and the description of the exemplary embodiments.

A haptic operating device according to the invention for a motor vehicle comprises a base plate or main body, wherein such a base plate may also be embodied as a holder in preferred configurations. The haptic operating device comprises a stationary central part connected to the base plate and a rotary knob with a hollow embodiment that is rotatable about the stationary central part and a magnetorheological transfer apparatus for targeted influencing of a rotational movement of the rotary knob. In particular, the magnetorheological transfer apparatus brakes a rotational movement of the rotary knob in a targeted fashion. The (magnetorheological) transfer apparatus comprises two components that are rotatable relative to one another, one component of which is embodied as a brake component (also referred to as rotary component) that is rotatable relative to the base plate. The stationary central part is fastened to the base plate by a carrier arm (or two or more carrier arms). The carrier arm is disposed adjacently to the transfer apparatus. The carrier arm and the transfer apparatus are received radially within the rotary knob. The rotary knob is rotationally conjointly coupled to the rotatable brake component by way of a coupling device. In particular, the transfer apparatus is completely received in the interior of the cavity of the rotary knob.

The haptic operating device according to the invention has many advantages. A significant advantage of the operating device according to the invention for a motor vehicle consists of the standing central part facilitating the arrangement of a stationary user interface that does not co-rotate with the rotary knob. The stationary central part is received radially within the rotary knob and adjacently to the transfer apparatus such that the stationary central part does not influence a rotational movement of the transfer apparatus.

The transfer apparatus and the central part are preferably received adjacent to one another and/or next to one another and radially within the rotary knob.

Particularly preferably, the carrier arm and the transfer apparatus are disposed next to one another. Therefore, the carrier arm is not disposed within the transfer apparatus but completely next to the latter. The carrier arm and the transfer apparatus do not penetrate one another.

The carrier arm and the transfer apparatus are preferably disposed in off-centered fashion with respect to one another and/or in off-centered fashion with respect to the rotary knob. This means that the axes of symmetry of the carrier arm and of the transfer apparatus are spaced apart from one another. Particularly preferably, the axes of symmetry are disposed radially within the rotary knob.

Preferably, the transfer apparatus is housed at least in part within the cavity of the rotary knob and, in particular, completely within said cavity. The transfer apparatus and the central part are housed adjacent to an one another but not nested in one another. Influencing within the meaning of the present invention is understood to mean, in particular, a braking of the rotational movement of the rotary knob.

In a simple configuration, another haptic operating device comprises in particular a base plate and a rotary knob with a hollow embodiment and a magnetorheological transfer apparatus for targeted influencing of a rotational movement of the rotary knob and, in particular, for braking said rotational movement. Here, the rotary knob is rotationally conjointly coupled to the transfer apparatus by way of a coupling device. The operating device may comprise a base plate, at which the magnetorheological transfer apparatus and the coupling device are disposed and/or fastened.

A base plate is provided in a further haptic operating device according to the invention. Moreover, this haptic operating device comprises a stationary central part and a rotary knob with a hollow embodiment that is rotatable about the central part, and a magnetorheological transfer apparatus for targeted influencing of a rotational movement of the rotary knob. Within the rotary knob, the transfer apparatus is received with a rotary component that is rotatable relative to the base plate and the rotary knob is rotationally conjointly coupled to the transfer apparatus by way of a coupling device.

In preferred configurations of all above-described operating devices, the rotary knob is rotationally conjointly coupled to the rotatable brake component by the coupling device in such a way that a spatial alignment of the rotary knob and of the rotatable brake component with respect to one another changes during the rotational movement of the rotary knob. Here, a spatial alignment also comprises an orientation in terms of angle such that different orientations in terms of angle are also different spatial alignments within the meaning of the present application.

Preferably, the coupling device comprises coupling means at the rotary knob and the rotatable brake component. Even further coupling means may be provided. By way of example, a further coupling means can be provided, the latter being in contact with the coupling means at the rotary knob on the one hand and being in contact with the coupling means at the brake component on the other hand. It is also possible that use is made of even more coupling means, which then, overall, bring about a coupling of the rotary knob with the rotatable brake component.

By preference, the coupling device comprises teeth, gear wheels, friction surfaces, belts, chains, gears and/or planetary gears and the like. In a simple configuration, the coupling device may be formed by two gear wheels or friction surfaces of friction wheels that are engaged in one another and bring about rotationally conjoint coupling.

Preferably, internal teeth are formed on an internal contour of the rotary knob and external teeth coupled to the internal teeth are formed on an external contour of the rotatable brake component. The coupling of the rotary knob with the rotatable brake component can be implemented by way of a direct engagement or, for example, by way of a coupling means such as a gear wheel or chain or the like.

Preferably, electrical cables are passed axially through the rotary knob. The electrical cables may comprise connection cables for the power supply, control cables and communication lines and more of same. A combination of all these cable types is also possible, as a result of which the passage opening must be correspondingly large. Possibly, a connector (contact) fixedly connected to the cable must be implemented during the assembly, requiring correspondingly large amounts of space.

In a preferred configuration, the central part comprises a carrier arm, the latter being connected (directly or indirectly) to the base plate at one end. Preferably, a carrier part is disposed at the other end of the carrier arm. The carrier arm preferably extends axially through the rotary knob. The carrier part can serve to carry various units and devices.

Preferably, the carrier arm is disposed off-center in relation to the rotary knob. In particular, the carrier arm (at least also) serves to guide the electrical cables. Electrical cables can be fastened to the carrier arm. It is also possible for the electrical cables or for some of the electrical cables to be guided through the hollow carrier arm. To this end, the carrier arm preferably has a cavity or at least one cavity.

Preferably, at least one illumination unit is received in the carrier part. Particularly preferably, at least one user interface is received in a carrier part. Such a user interface may comprise an operating panel, a display, a touch-sensitive display (touch display) with or without haptic feedback and/or at least one sensor. By way of example, a sensor such as a fingerprint sensor or a camera or the like can be provided at the user interface in order to register and recognize the fingerprint of a user. A camera, inter alia with a camera-based object recognition, can likewise be used to recognize the user. An operating panel can be embodied as a touch panel and can serve to input commands and gestures. The unit in the standing central part can be activated and/or deactivated when the user (e.g., hand; finger) approaches or moves away.

In all configurations, it is preferable for the rotary knob and the rotatable brake component to be separately rotatably mounted. Here, it is possible for the rotary knob and the brake component to be mounted by way of dedicated bearings such as sliding bearings or rolling bearings. However, it is also possible for the rotary knob and the rotatable brake component to be rotatably received in corresponding low-friction guides and consequently be mounted. In particular, the magnetorheological transfer apparatus, which can also be referred to as brake device in preferred configurations, is disposed within the rotary knob. The rotatable brake component and the rotary knob can be received nested in one another.

Preferably, one of the components of the transfer apparatus is formed as a stationary brake component. However, it is also conceivable that both components of the transfer apparatus each have a rotatable configuration.

Preferably, the stationary brake component is disposed radially on the inside and surrounded by the rotatable brake component. The rotatable brake component may form a closed brake housing.

In particular, the stationary brake component comprises a shaft that is connected to the base plate, the latter then being surrounded by the rotatable brake component in particular. The shaft can have a thin and solid embodiment and need not have a hollow embodiment. Preferably, no cables or lines are guided through the shaft.

By preference, the transfer apparatus has exactly one shaft output, which is sealed by way of exactly one contacting seal. In particular, the contacting seal is disposed between the rotatable brake component and the stationary brake component. The contacting seal can be embodied as a sealing ring and can be embodied, for example, as an O-ring, as a lip-type seal, a wiper ring or as a quad-ring.

In preferred configurations, the transfer apparatus has the shaft output on one side and a closed wall on the opposite side. Then, the rotatable brake component overall forms a closed brake housing with a shaft output.

It is possible and preferable in all configurations for the rotary knob to have a substantially sleeve-shaped embodiment.

Preferably, the rotary knob comprises two tubular parts that are axially displaceable with respect to one another, said tubular parts, in particular, being rotationally conjointly coupled to one another by way of coupling pins or guides or the like. In particular, the displaceable tubular parts are preloaded into the axially extended position by way of a preloading device.

Preferably, the rotary knob or a tubular part is mounted to the base plate by way of at least one bearing. In particular, the rotary knob and/or a tubular part of the rotary knob is axially displaceable (push/pull).

Preferably, the rotary knob and/or a part of the rotary knob is axially displaceable and provides haptic feedback in the region of the end position. Other pressure functions may also be integrated into the rotary knob such that a signal is triggered upon an axial actuation of the rotary knob and, in particular, haptic feedback is provided in return. Pulling the knob (pull) is also possible. Likewise, the entire operating element can be additionally displaced to the side (X and Y direction/movement).

Preferably, at least one sensor for detecting an axial actuation in the form of, e.g., an actuation sensor and/or a sensor for detecting an angle change or an absolute angle position is associated with the rotary knob.

It is preferable in all configurations for a difference between a clear internal diameter of the rotary knob and an external diameter of the transfer apparatus to be greater than 3 mm and less than 50 mm. Preferably, the difference lies between 10 mm and 30 mm.

In preferred configurations, an external diameter of the rotary knob is between 10 mm and 90 mm and in particular between 20 mm and 90 mm. A height of the rotary knob is preferably between 10 mm and 60 mm.

It is preferable in all configurations for the transfer apparatus to comprise a magnetic circuit and a magnetic field generating device with at least one electric coil and a gap between the stationary brake component and the rotatable brake component, the gap or channel between the two components of the transfer apparatus preferably being provided or equipped with a magnetorheological medium.

Particularly preferably, rotary bodies that serve in particular as magnetic field concentrators are disposed between the stationary brake component and the rotatable brake component or between the two components of the transfer apparatus that are rotatable relative to one another. In particular, the rotary bodies are surrounded by the magnetorheological medium. The functionality of influencing the rotational movement by way of rotary bodies in a gap or channel between two components of a magnetorheological transfer apparatus is described in WO 2012/034697 A1 and in WO 2017/001696 A1, and is used in a similar way or in the same way in a manner adapted to the structure present here.

A significant advance to the invention also consists of the fact that the base torque, low in any case, can be reduced even further since there is, regularly, a transformation of the rotational speed of the rotary knob. In a specific configuration, the ratio is between 3:1 and can, however, also become larger and reach or exceed 4:1, or it can be smaller than 2:1. The effective base torque at the transfer apparatus is reduced accordingly as a result, which once again significantly contributes to the ease of movement.

Further advantages and features of the present invention arise from the exemplary embodiments, which are explained below with reference to the attached drawing.

DESCRIPTION OF THE INVENTION

Figure 1:
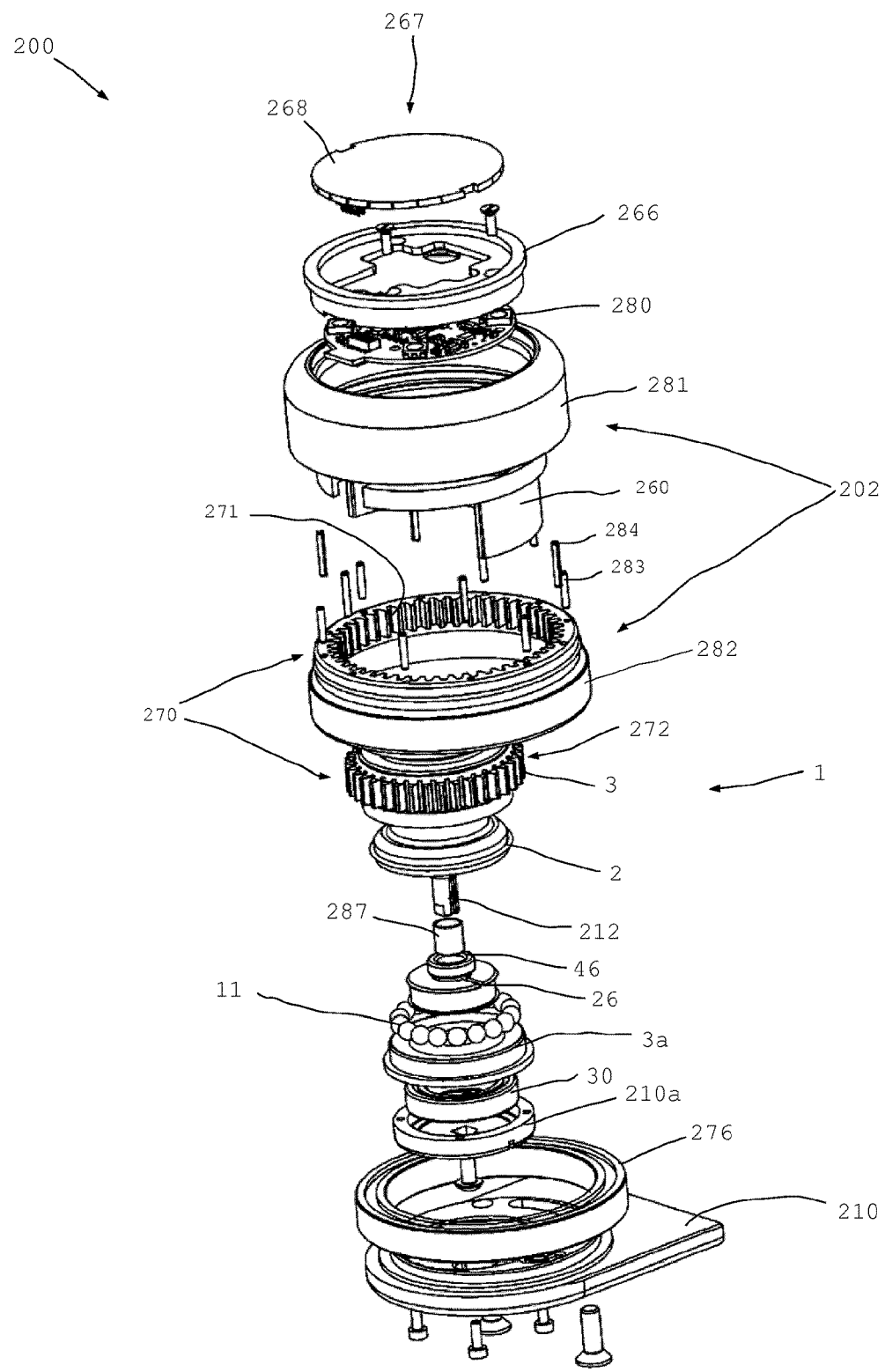
FIG. 1 shows a schematic perspective exploded view of a haptic operating device according to the invention for a motor vehicle.

FIG. 1 shows a schematic perspective exploded view of a haptic operating device 200 according to the invention for a motor vehicle, which comprises a main body 210 or base plate 210. The receptacle 210a can have an integral embodiment with the base plate or else it can be embodied as a separate part; it serves to receive the magnetorheological transfer apparatus 1.

Here, the magnetorheological transfer apparatus 1 comprises a rotatable brake component 3, which is formed by the principal part of the rotatable brake component 3 and the lower part 3a. During the assembly, the two parts 3, 3a are pressed together and consequently form a closed housing or the rotatable brake component 3 overall. Received in the rotatable brake component 3 is the stationary brake component or component 2, which is guided out of the rotatable component 3 via a stationary shaft 212. The stationary shaft 212 is fastened to the base plate 210 or to the receptacle 210a. By way of example, the shaft can be screwed to the receptacle 210a or the base plate 210 by way of a screw such that the shaft 212, and hence the stationary brake component 2, is securely received at the base plate 210. The rotatable brake component 3 and/or 3a is rotatably received in relation to the base plate 210 or the receptacle 210a by way of a rolling bearing 30. A protective sleeve 287 made of a hard or hardened or coated (e.g., hard chrome coating) material is pushed over the shaft 212 consisting of a magnetically conductive material during the assembly. The seal 46 in the part 3a acts on the protective sleeve 287 such that no grooves arise on the stationary shaft 212, even during operation.

The rotatable brake component 3 or the upper part thereof has external teeth 272 on the external circumference, said external teeth meshing with the internal teeth 271 of the rotary knob 202 in the assembled state. As a result, a rotational movement of the rotary knob 202 is transferred to the rotatable brake component 3.

Here, the rotary knob 202 substantially consists of two parts, specifically an upper tubular part 281 and a lower tubular part 282, in which the inner teeth 271 are formed in this case.

The two tubular parts 281 and 282 are rotatably conjointly connected to one another. By way of example, this can be implemented by way of coupling pins 283, which are inserted in corresponding receptacles in the tubular parts 281 and 282. Springs 284 can be inserted into the coupling pins 283, said springs consequently preloading the tubular parts 281, 282 into a base position where they are axially spaced apart from one another. Instead of the coupling pins, which engage in pores, use can also be made of linear guides (recirculating ball guides, linear ball guides, profile guides . . . ).

The stationary central part 260 is disposed in the interior cavity 261 of the rotary knob 202 and connected to the base plate 210. The standing central part 260 comprises a carrier arm 263, which extends from the base plate 210 at one end to the upper end at which a carrier part 264 is formed. The carrier part 264 serves to carry the circuit board 280 and the illumination unit 266 disposed thereon. Here, the user interface 267 is disposed at the top; said user interface may provide an operating panel of the haptic operating device. By way of example, the operating panel can also be embodied as a display or as a touch sensitive display.

Figure 2:
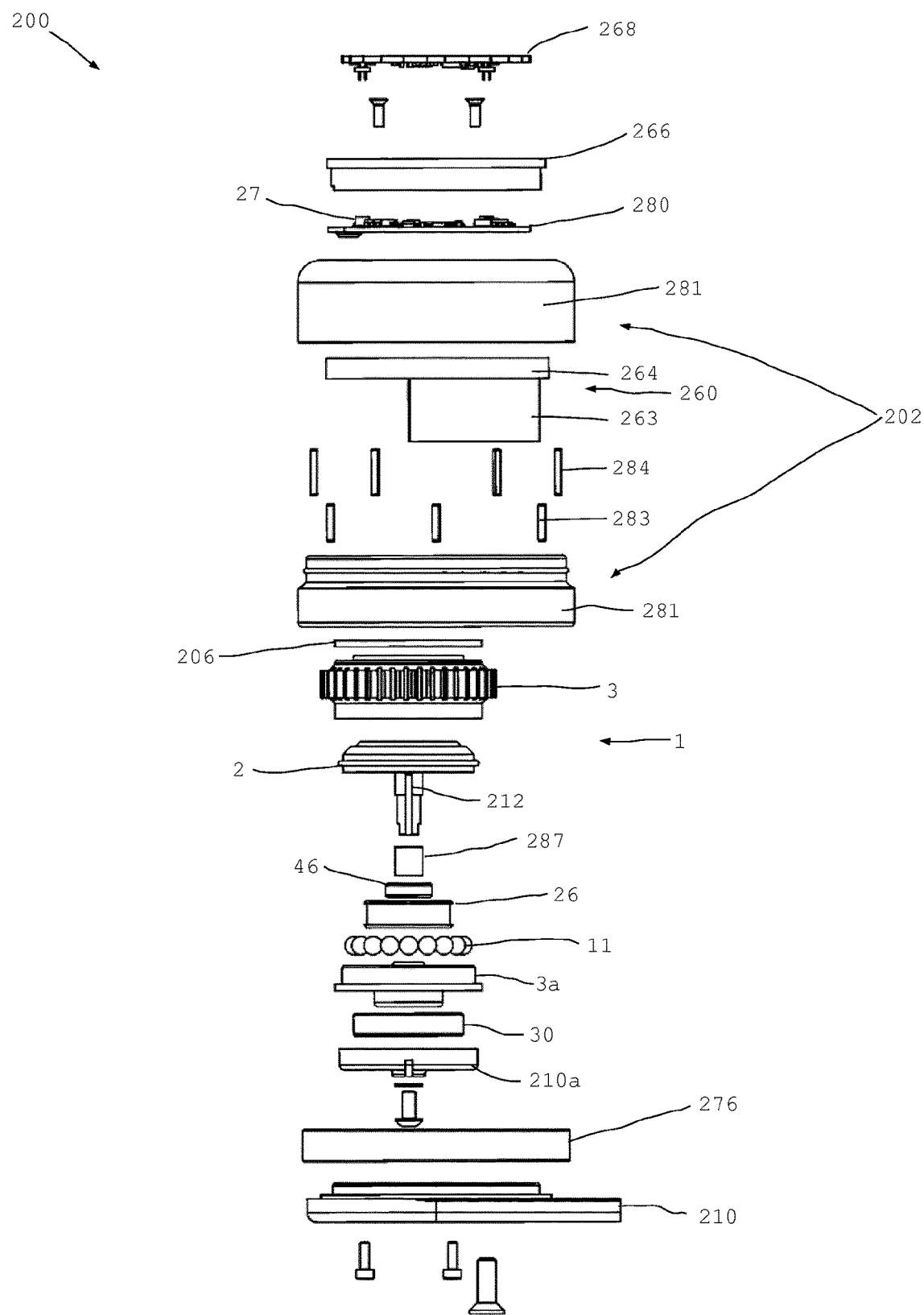
FIG. 2 shows a side view of the exploded view of the haptic operating device according to FIG. 1.

FIG. 2 shows a side view of the haptic operating device 200 from FIG. 1 in an exploded view. The rotatable brake component 3 comprises a lower part 3a and the upper part, which both overall are referred to as rotatable component 3 and which receive the stationary brake component 2 therein. Moreover, the rotary bodies 11 and the coil 26 including a coil holder 26a are received in the interior of the rotatable brake component 3. The remainder of the cavity is filled by a magnetorheological medium 6 (cf., FIG. 4). The shaft 212 is sealed to the outside by the seal 46, the latter interacting with the protective sleeve 287 that is applied to the shaft 212.

When put together, the tubular parts 281 and 282 yield the rotary knob 202, which has an embodiment with a hollow interior and which is formed in a sleeve-like manner. This means that the rotary knob 202 has a respectively open embodiment both at the upper and at the lower axial end and has no wall. At the upper axial end, and consequently at the end distant from the base plate 210, the haptic operating device 200 is completed by the operating panel 268, which, in particular, has a touch-sensitive or pressure-sensitive embodiment.

Figure 3:
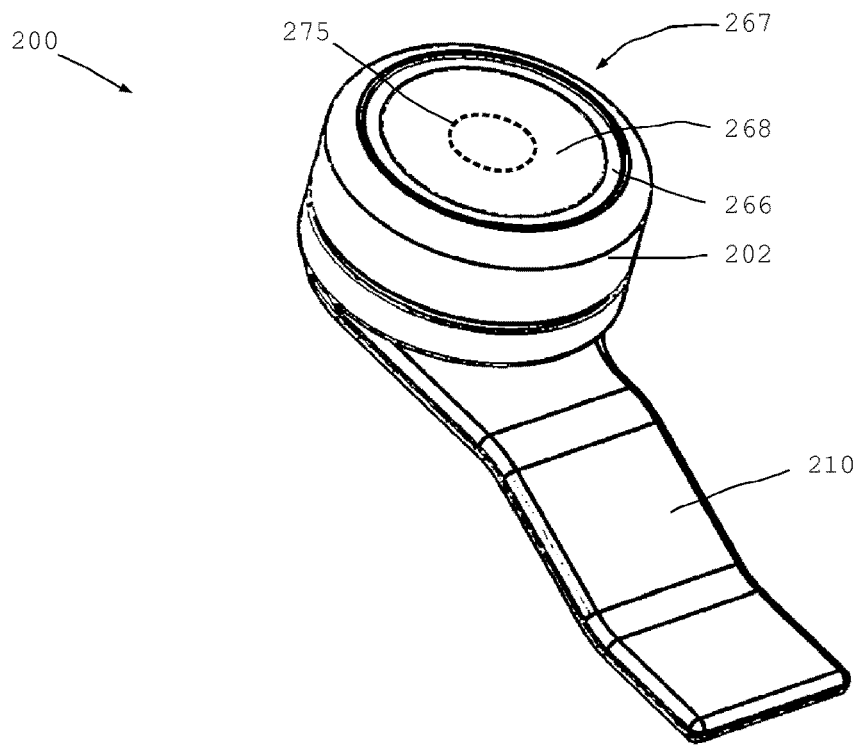
FIG. 3 shows a haptic operating device for a motor vehicle according to the present invention.

FIG. 3 shows a perspective illustration of an exemplary embodiment of a haptic operating device 200, as illustrated in an exploded view in FIGS. 1 and 2. The base plate 210 can have embodiments of different lengths and have different forms. In the illustration according to FIG. 3, the haptic operating device 200 is suitable to be received hovering above the background. By way of example, the rotary knob 202 with the user interface 267 can be illuminated by an illumination unit 266. By way of example, a sensor 275 can be integrated on the surface. It is also possible that the surface of the user interface 267 is suitable, overall or in part, for recording images, for example, such that, e.g., a fingerprint can be recorded and recognized by the haptic operating device 200 following contact with a finger.

Figure 4:
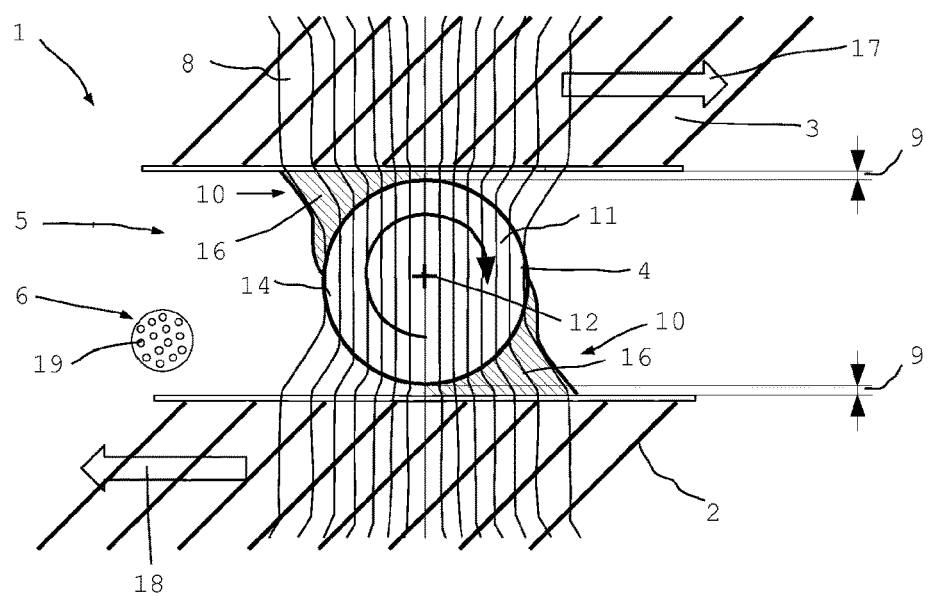
FIG. 4 shows a very schematic cross section through a rotary body of a haptic operating device according to FIGS. 1-3.

FIG. 4 shows a very schematic cross-sectional view of a magnetorheological transfer apparatus 1 according to the invention, for influencing the force transfer between two components 2 and 3. Here, a rotary body 11 is provided as a separate part 4 between the two components 2 and 3 in FIG. 4. Here, the rotary body 11 is embodied as a sphere 14. However, it is likewise possible to embody rotary bodies 11 as cylinders or as ellipsoids, as rollers or as any other rotatable rotary bodies. Even rotary bodies that are not rotationally symmetric in the true sense, such as, e.g., a gear wheel or a rotary body 11 with a specific surface structure, can be used as a rotary body. The rotary bodies 11 are used not to bear one another but, instead, to transfer torque.

A channel 5, filled with a medium 6 in this case, is provided between the components 2 and 3 of the magnetorheological transfer apparatus 1. Here, the medium is a magnetorheological fluid 20, which, e.g., comprises an oil as a carrier liquid, in which ferromagnetic particles 19 are present. Glycol, fat or viscous substances may also be used as a carrier medium, without being restricted thereto. The carrier medium may also be gaseous or the carrier medium can be dispensed with (vacuum). In this case, only particles that are able to be influenced by the magnetic field are filled into the channel.

The ferromagnetic particles 19 are preferably a carbonyl iron powder, the size distribution of the particles depending on the specific use. A particle size distribution of between one and ten micrometers is specifically preferred, with, however, larger particles of twenty, thirty, forty and fifty micrometers also being possible. Depending on the application, the particle size can also become significantly larger and even penetrate into the millimeter range (particle spheres). The particles may also have a special coating/cladding (titanium coating, ceramic, carbon cladding, etc.) so that they better endure the high pressure loads occurring depending on the application. The MR particles for this application case can be produced not only from carbonyl iron powder (pure iron) but also, e.g., from specific iron (harder steel).

The rotary body 11 is made to rotate about its axis of rotation 12 as a result of the relative movement 17 between the two components 2 and 3 and practically runs along the surface of the component 3. At the same time, the rotary body 11 runs along the surface of the other component 2 such that a relative speed 18 is present there.

Strictly speaking, the rotary body 11 is not in direct contact with the surface of the component 2 and/or 3 and therefore does not roll directly thereon. The clear distance 9 from the rotary body 11 to one of the surfaces of the component 2 or 3 is 140 μm, for example. In a specific configuration of particle sizes between 1 μm and 10 μm, the clear distance lies, in particular, between 75 μm and 300 μm and, particularly preferably, between 100 μm and 200 μm.

In particular, the clear distance 9 is at least ten times the diameter of the typical mean particle diameter. Preferably, the clear distance 9 is at least ten times the size of a largest typical particle. On account of the lacking direct contact, a very low base friction/base force/base torque arises during the relative movement of the components 2 and 3 with respect to one another.

If a magnetic field is applied to the magnetorheological transfer apparatus 1, field lines are formed depending on the distance between the rotary bodies 11 and the components 2, 3. The rotary body consists of the ferromagnetic material and, e.g., of ST 37 in this case. The steel type ST 37 has a magnetic permeability μr of approximately 2000. The field lines pass through the rotary body and concentrate in the rotary body. A high flux density in the channel 5 prevails at the entry and exit face, radial in this case, of the field lines at the rotary body. The field that is inhomogeneous and strong there leads to local and pronounced linking of the magnetically polarizable particles 19. As a result of the rotational movement of the rotary body 11 in the direction of the wedge that is forming in the magnetorheological fluid, the effect is greatly increased and the possible brake or coupling torque is magnified to the extreme, far beyond the value that is normally generable in the magnetorheological fluid. Preferably, rotary bodies 11 and component 2, 3 consist at least in part of ferromagnetic material, which is why the magnetic flux density becomes ever higher the smaller the distance is between rotary body 11 and component 2, 3. As a result, a substantially wedge-shaped region 16 forms in the medium, the gradient of the magnetic field in said wedge increasing strongly to the acute angle at the contact point or the region of smallest distance.

Despite the distance between rotary body 11 and component 2, 3, the rotary body 11 can be put into rotational movement by the relative speed of the surfaces with respect to one another. The rotational movement is possible both without and with an acting a magnetic field 8.

When the magnetorheological transfer apparatus 1 is exposed to a magnetic field 8 of a magnetic field generating device 7 that is not illustrated here in FIG. 4, the individual particles 19 of the magnetorheological fluid 20 link along the field lines of the magnetic field 8. It should be noted that the vectors, plotted in FIG. 4, only very schematically represent the region of the field lines that is relevant to influencing the MRF 20. The field lines enter the channel 5 substantially perpendicular to the surfaces of the ferromagnetic components and need not extend in a straight line, especially in the acute angled region 10.

At the same time, some material of the magnetorheological fluid 20 is also put into rotation at the circumference of the rotary body 11 such that an acute angled region 10 forms between the component 3 and the rotary body 11. An equal acute angled region 10 arises between the rotary body 11 and the component 2 on the other side. By way of example, in the case of rotary bodies 11 configured in a cylindrical fashion, the acute angled regions 10 may have a wedge shape 16. The further rotation of the rotary body 11 is impeded by the wedge shape 16, and so the effect of the magnetic field on the magnetorheological fluid is increased since greater cohesion of the medium 6 arises within the acute angled region 10 as a result of the magnetic field acting there. As result, the effect of the magnetorheological fluid is amplified in the accumulated pile (the link formation in the fluid and hence the cohesion or the viscosity), making the further rotation or movement of the rotary body 11 more difficult.

Substantially greater forces or torques can be transferred by the wedge form 16 than would be possible with a comparable structure that only uses shear movement without a wedge effect.

The forces that are transferable directly by the applied magnetic field only represent a small portion of the forces transferable by the apparatus. The wedge formation and hence a mechanical force amplification can be controlled by way of the magnetic field. The mechanical amplification of the magnetorheological effect can go so far that the force transfer is even possible after an applied magnetic field has been deactivated if the particles were wedged.

It was found that a significantly greater effect of a magnetic field 8 of a given strength is obtained by the wedge effect of the acute angled region 10. Here, the effect can be amplified multiple times. In one specific case, influencing of the relative speed of two components 2 and 3 with respect to one another that was approximately ten times stronger than in the prior art in the case of MRF couplings was observed. The possible amplification depends on different factors. Optionally, it can be amplified even further by a greater surface roughness of the rotary bodies 11. It is also possible for outwardly projecting protrusions to be provided on the outer surface of the rotary bodies 11, which can lead to an even stronger wedge formation.

The wedge action or the wedge effect is distributed in areal fashion on the rotary body 11 and the components 2 or 3.

Figure 5:
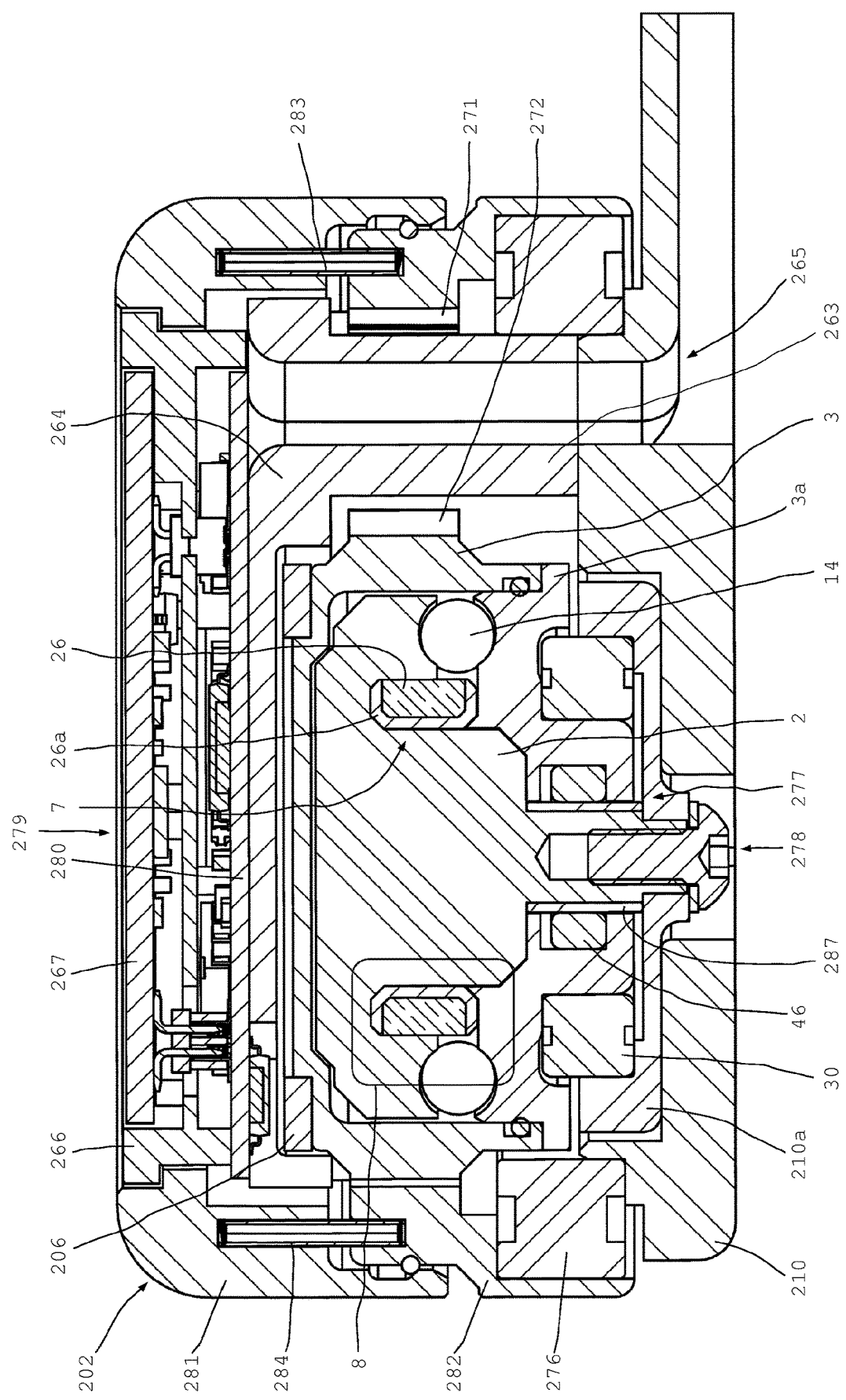
FIG. 5 shows a cross section through a haptic operating device for a motor vehicle.

FIG. 5 shows a cross section through an embodiment of a haptic operating device 202. The haptic operating device 200 is assembled on a base plate 210, which comprises a separate receptacle 210*a* for the magnetorheological transfer apparatus 1 in this case. The transfer apparatus 1 comprises two components 2, 3, wherein the component 2 is embodied as a stationary brake component and screwed to the receptacle 210*a*. In this case, the brake component 2 has an approximately mushroom-shaped form and comprises the shaft 212 and accommodates in the mushroom-shaped part the electrical coil 26 in a coil holder 26*a* as a magnetic field generating device 7. The electrical coil 26 is wound around the axis of symmetry of the stationary brake component 2.

The rotatable brake component 3 comprises an upper part and a lower part 3*a*, which are pressed together during the assembly. The plotted seal between the two parts of the rotatable brake component 3 serves to seal possible gaps.

Rotary bodies 11, which are guided in corresponding receptacles of the stationary brake component 2 and the rotational brake component 3, are received in the rotatable brake component 3. The magnetic field 8 is plotted in exemplary fashion at one rotary body 11 and passes through the rotary body 11, with the rotary bodies 11 being embodied as spheres 14 in this case. The spheres 14 are disposed in a gap 5, which is filled with a magnetorheological medium and, in particular, with a magnetorheological fluid.

The rotary knob 202 has a larger internal diameter and, as visible in FIGS. 1 and 2, comprises internal teeth 271 on the internal circumference, said internal teeth engaging with external teeth 272 of the rotatable brake component 3 on the left-hand side in this case.

As a result, a clear interstice arises in this case on the right-hand side, the stationary central part 260 being disposed therein and extending from the base plate to above the rotatable brake component 3. Above the rotatable brake component 3, the stationary central part 260 forms a carrier part 264, to which the illumination unit 266, the user interface 267 and an operating panel 168 are applied.

The tubular parts 281 and 282 of the rotary knob 202 are coupled to one another by way of coupling pins 283 in this case. Springs 284 are disposed in the hollow coupling pins 283, said springs preloading the two tubular parts in a base position axially spaced apart from one another.

The rotary knob 202 is mounted directly on the base plate 210 by way of a rolling bearing 276. The transfer apparatus 1 or the rotatable brake component 3 is rotatably mounted on the base plate 210 or on the receptacle at 210*a* by way of a bearing 30, which is likewise embodied as a rolling bearing.

An angle sensor 206 detects an angular position of the rotary knob 202. An actuation sensor 204 is activated in the case of an axial actuation of the rotary knob 202, it not being possible to recognize said actuation sensor here in FIG. 5.

Figure 6:
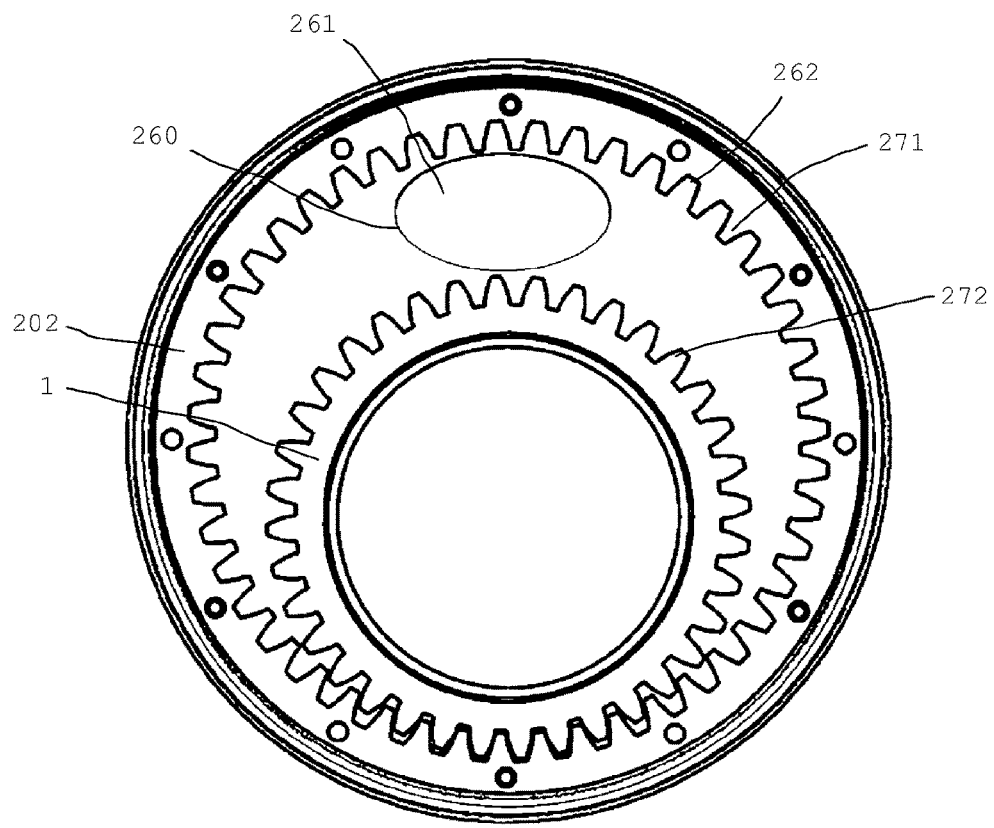
FIG. 6 shows a very schematic cut plan view of a haptic operating device for a motor vehicle.

FIG. 6 shows a schematic cross-section in a plan view, it being possible in this case to recognize the diameters of different sizes of the rotary knob 202 and of the transfer apparatus 1. The transfer apparatus 1 is rotationally conjointly coupled to the rotary knob 202 by way of a coupling device 270 such that a rotation of the rotary knob 202 is directly converted into a rotation of the transfer apparatus 1 or into a rotation of the rotatable brake component 3 of the transfer apparatus 1. Here, the coupling device 270 comprises internal teeth 271 at the rotary knob 202 and external teeth 272 at the rotatable brake component 3. Here, the clear space for the stationary central part 260 is also recognizable, said stationary central part consequently being able to pass axially through the rotary knob 202 proceeding from the base plate, without impeding the rotational movement of the rotary knob or of the rotatable brake component. Electrical cables 241 can be passed through the inner cavity 261 of the stationary central part 260 in order to supply power to the user interface 267, the illumination unit 266 or the operating panel 268 and in order to provide communication lines.

Figure 7:
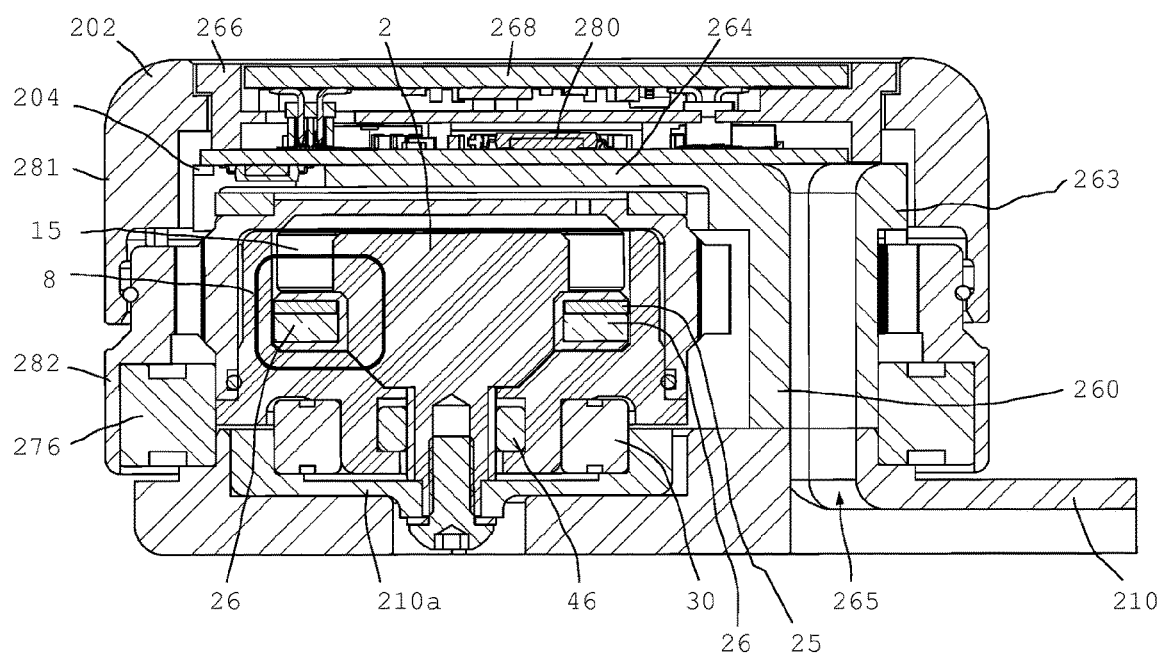
FIG. 7 shows a further cross section through a haptic operating device for a motor vehicle.

FIG. 7 shows a modified embodiment of the haptic operating device 200 of FIG. 5, with the actuation sensor 204 also been plotted in this case. In contrast to the exemplary embodiment according to FIG. 5, cylindrical or roller-shaped rotary bodies 11 are provided in the exemplary embodiment according to FIG. 7.

Moreover, a permanent magnet 25 is plotted in exemplary fashion; it can provide a permanent magnetic field. The magnetic field of the permanent magnet 25 can be influenced by the magnetic field of the electric coil 26 and can also be canceled in the case of appropriate polarity. It is also possible that the permanent magnet 25 is set by electrical pulses of the electrical coil 26.

Figure 8:
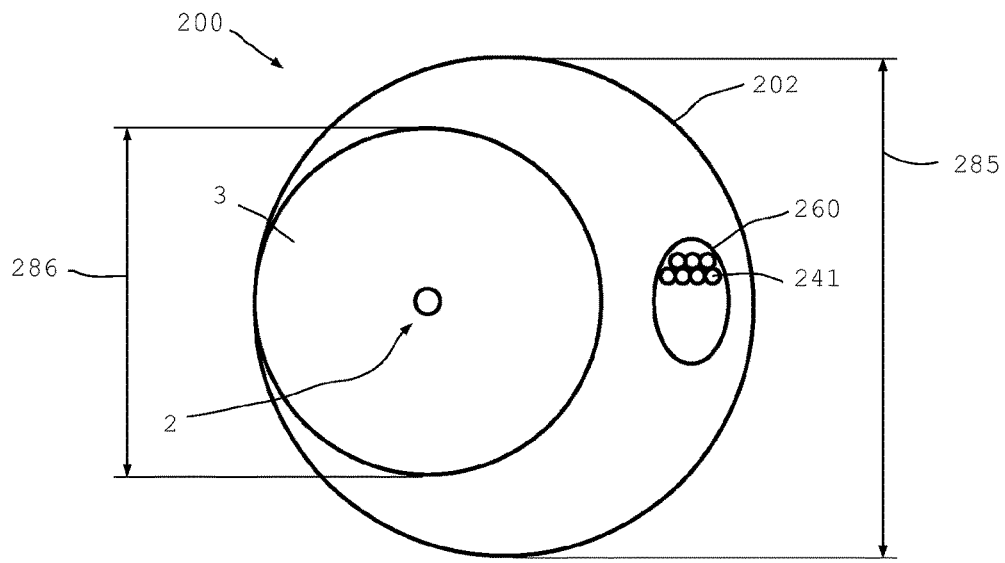
FIGS. 8-10 show schematic cut plan views of further haptic operating devices.

FIG. 8 shows a schematic cross section in a plan view, wherein the haptic operating device 200 in this case once again comprises a rotary knob 202 and a transfer apparatus 1 with an external rotatable brake component 3 and an inner stationary brake component 2. Electrical cables 241 can be guided to the operating panel, not recognizable here, through a stationary central part 260. The maximum width available for the stationary central part 260 is a width that arises from a difference between the internal diameter 285 of the rotary knob 202 and the external diameter 286 of the transfer apparatus 1.

In the illustration according to FIG. 8, the coupling device 270 can also be formed by friction surfaces on the outer surface of the rotatable brake component 3 and the inner surface of the rotary knob 202.

Figure 9:
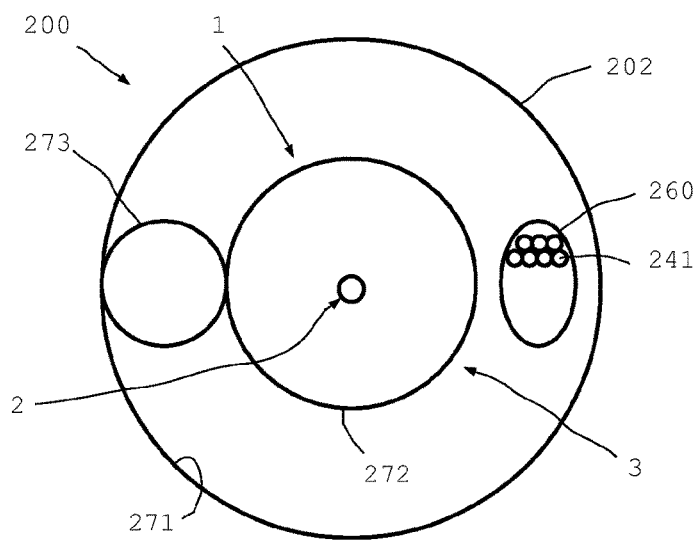

FIG. 9 shows a further variant, wherein the transfer apparatus 1 in this case has an outer rotatable brake component 3 again. The rotatable brake component 3 is rotatable about the central axis of symmetry of the transfer apparatus 1 and of the rotary knob 202. In this case, the coupling device 270 comprises, e.g., a gear wheel 273 as a coupling means between the internal teeth of the rotary knob 202 and the external teeth of the transfer apparatus 1. As a result, enough installation space is also available for stationary central part 260.

Figure 10:
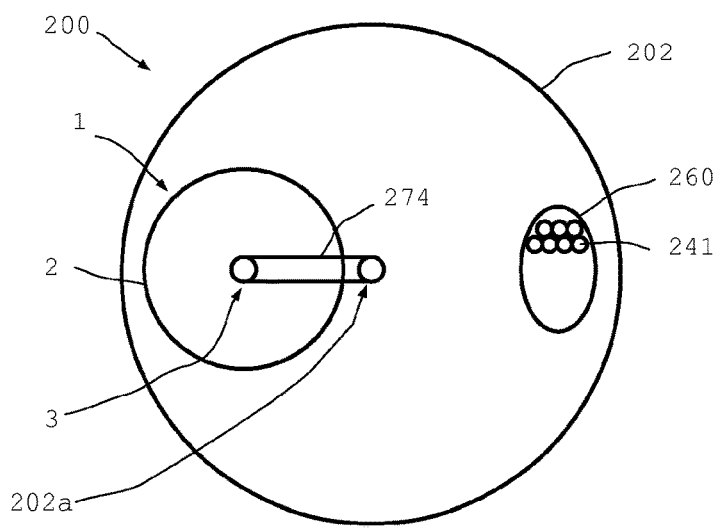

FIG. 10 shows another variant, in which the coupling device 270 comprises a belt 274 or a chain, by means of which the rotational movement is transferred from a central rotational shaft 202a to the rotatable brake component 3. In this configuration, the stationary brake component 2 surrounds the rotatable brake component 3. In this configuration, the rotary knob 202 can be covered by a transparent pane, for example, at which the rotational shaft 202a is attached centrally, the latter being guided into the inner cavity of the rotary knob 202 through the operating panel 268, the belt 274 for coupling with the transfer apparatus 1 being disposed in said inner cavity. Sufficient installation space for the stationary central part 260 also arises in such a configuration. If use is made of capacitive or optical sensors, the user interface 267 can also be used for the input of data, even if the user interface 267 is covered by the e.g. transparent wall of the rotary knob 202.

Figure 11A:
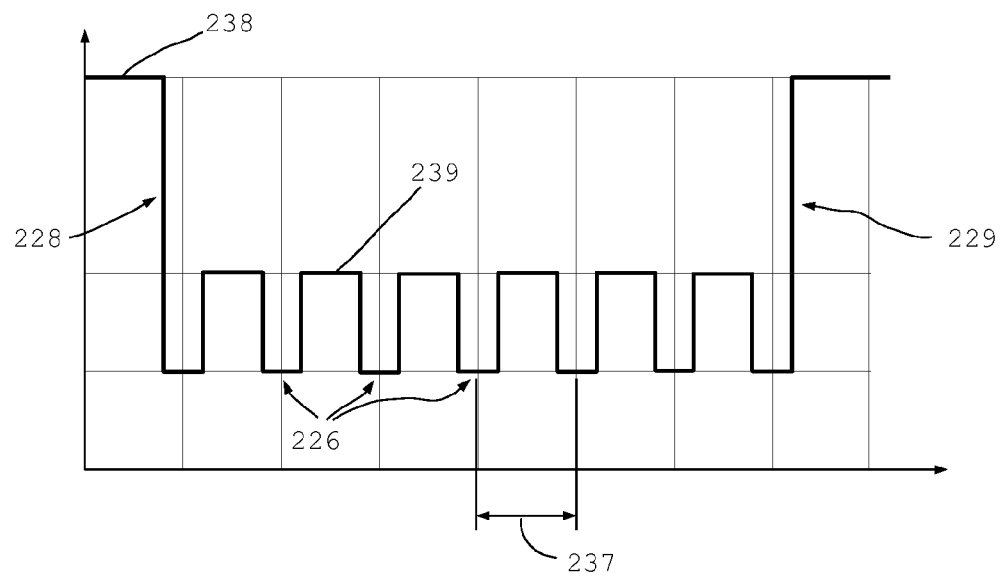
FIG. 11a-11c shows possible torque profiles against the rotational angle of a haptic operating device according to the invention for a motor vehicle.
Figure 11B:
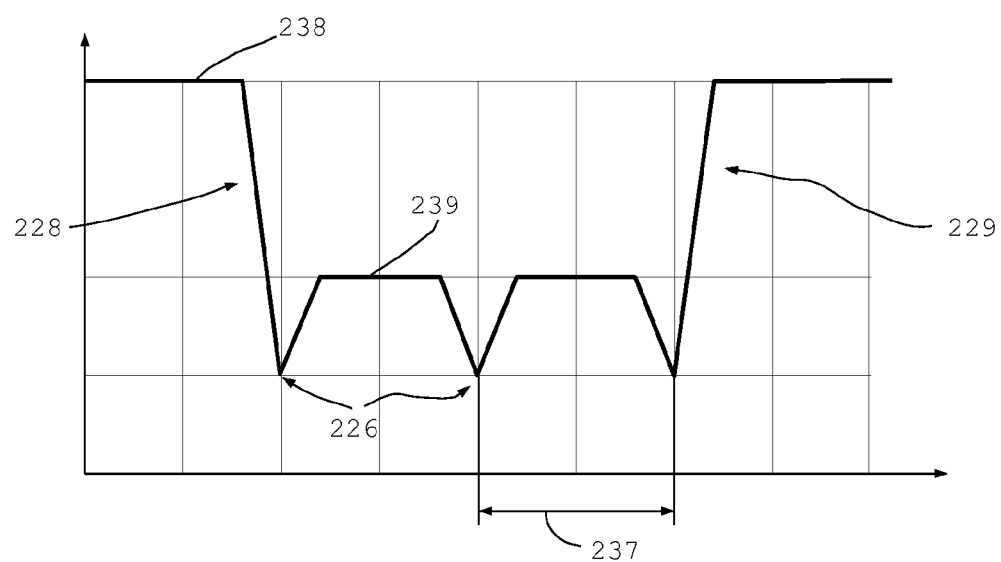
Figure 11C:
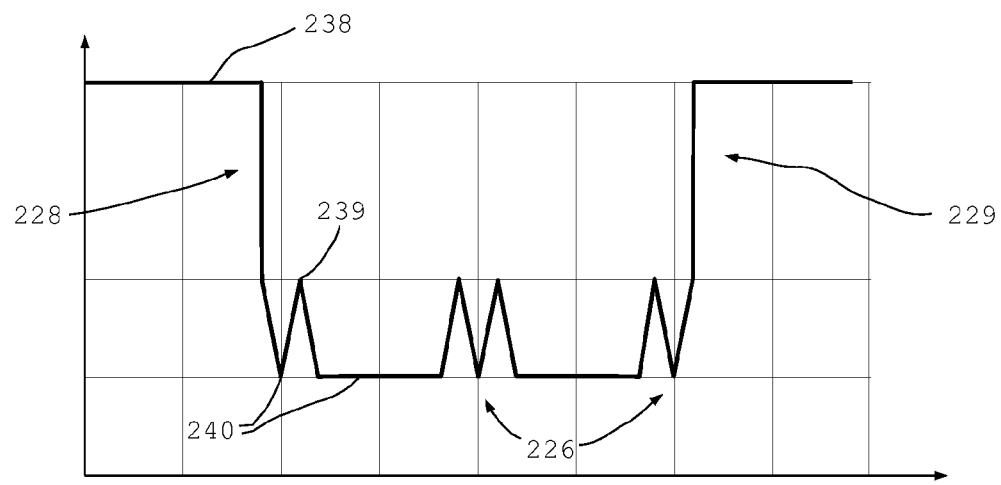

FIGS. 11a, 11b and 11c illustrate possible embodiment variants for the dynamically generated magnetic field or the dynamically produced brake torque as a function of the rotational angle. Very different brake torques can be generated depending on the menu selection. Examples of menus in the case of motor vehicles include: air-conditioning level; temperature to the left or right; seat adjustment; volume. An operating menu can be chosen by pressing or pulling the operating element.

Here, FIG. 11a shows a variant in which a left end stop 228 and a right end stop 229 are generated. A high magnetic field or stop torque 238 is generated if the rotary knob 202 is rotated further, as a result of which the rotary knob 202 puts up a high resistance against a rotational movement.

A first latching point 226, which corresponds to a first menu item 225, is provided directly next to the left end stop 228. Should the next menu item be selected, the rotary knob 202 must be rotated clockwise. To this end, the dynamically generated higher magnetic field or cogging torque 239 or the frictional torque thereof must be overcome before the next latching point 226 is reached. In FIG. 11a, a magnetic field that is constant in each case is generated for a certain angle range, in each case at the latching points 226 and at the regions lying therebetween, said magnetic field being substantially lower at the latching points than in the regions lying therebetween and being once again significantly lower than at the stops 228, 229.

An angle spacing 237 between individual latching points is dynamically modifiable and adapted to the number of available latching points or menu items.

FIG. 11b shows a variant in which the magnetic field does not increase abruptly at the end stops 228, 229 but has a steep profile instead. Furthermore, ramp-like gradients of the magnetic field are provided on both rotational sides of the latching points 226, as a result of which the rotational resistance increases in the corresponding rotational directions. Here, only three latching points 226 are made available by the same operating device 200, the angle spacing 237 of said latching points being greater than in the example according to FIG. 11a.

FIG. 11c shows a variant in which a lower rotational resistance is present between the individual latching points 226 and in which a respectively elevated magnetic field 239 is only generated directly adjacent to the latching points 226 in order to facilitate latching of the individual latching points 226 and, the same time, to provide only a small rotational resistance between the individual latching points.

In principle, a mixture of the modes of operation and of the magnetic field curves of FIGS. 11a, 11b and 11c is also possible. By way of example, a correspondingly different setting of the magnetic field curve can be implemented in different submenus. Preferably, the current and hence torque changes are harmonious (smooth transitions, rounded, . . . ) such that a haptically good or comfortable operating feeling arises.

It is also possible in all cases that, e.g., in the case of a ripple (latching), switching is not carried out as previously between less and more current with the polarity (i.e., for example, +0.2 to +0.8 A=ripple), but, alternately, with a change in polarity, i.e., from +0.2 to +0.8 A and then the next ripple with −0.2 A to −0.8 A and then the next torque peak from +0.2 to +0.8 A, etc.

The preferably low-allow steel may keep a residual magnetic field. The steel is demagnetized (alternating field), preferably at regular intervals or when necessary.

If the rotary unit is not rotated, i.e., if the angle is constant, the current is preferably continuously reduced over time. The current can also be varied in speed-dependent fashion (angular speed of the rotary unit).

LIST OF REFERENCE SIGNS

| | |
|---|---|
| 1 | Transfer apparatus |
| 2 | Component, stationary brake component |
| 3 | Component, rotatable brake component |
| 3a | Part of 3 |
| 4 | Separate part |
| 5 | Gap, channel |
| 6 | Medium |
| 7 | Magnetic field generating device |
| 8 | Field |
| 9 | Clear distance |
| 10 | Acute angled region |
| 11 | Rotary body, rotatable transfer element |
| 12 | Axis of rotation |
| 14 | Sphere |
| 15 | Cylinder |
| 16 | Wedge shape |
| 17 | Direction of the relative movement |
| 18 | Direction of the relative movement |
| 19 | Magnetic particles |
| 25 | Permanent magnet |
| 26 | Coil |
| 26a | Coil holder |
| 27 | Control device |
| 30 | Bearing |
| 46 | Sealing ring |
| 200 | Operating device |
| 202 | Rotary knob |
| 204 | Actuation sensor |
| 206 | Angle sensor |
| 210 | Base plate |
| 210a | Receptacle |
| 212 | Shaft |
| 226 | Latching point |
| 227 | Rotational direction |
| 228 | End stop |
| 229 | End stop |
| 237 | Angle spacing |
| 238 | Stop torque |
| 239 | Cogging torque |
| 240 | Base torque |
| 241 | Cable |
| 260 | Stationary central part |
| 261 | Cavity in 202 |
| 262 | Internal contour of 202 |
| 263 | Carrier arm |
| 264 | Carrier part |
| 265 | Cavity in 263 |
| 266 | Illumination unit |
| 267 | User interface |
| 268 | Operating panel |
| 270 | Coupling device |
| 271 | (Internal) teeth |
| 272 | (External) teeth |
| 273 | Gear wheel |
| 274 | Belt, chain |
| 275 | Sensor |
| 276 | Bearing of 202 |
| 277 | Shaft output |
| 278 | Side |
| 279 | Side |
| 280 | Circuit board |
| 281 | Tubular part |
| 282 | Tubular part |
| 283 | Coupling pin |
| 284 | Spring |
| 285 | Internal diameter of 202 |
| 286 | Diameter of 1 |
| 287 | Protective sleeve |

The invention claimed is:

1. A haptic operating device for a motor vehicle, the operating device comprising:
a base plate, a stationary central part connected to said base plate, and a hollow rotary knob rotatably mounted about said stationary central part, said hollow rotary knob being rotatably mounted about a central rotation axis;
a magnetorheological transfer apparatus for targeted influencing of a rotational movement of said rotary knob, said transfer apparatus having two components that are rotatable relative to one another, a first component being a brake component that is rotatable relative to said base plate about a rotation axis that is parallel to the central rotation axis and radially offset from the central rotation axis;
said stationary central part being fastened to said base plate by way of a carrier arm and said transfer apparatus and said carrier arm being disposed adjacent to one another and received radially within said rotary knob; and
a coupling device rotationally conjointly coupling said rotary knob to said rotatable brake component.

2. The operating device according to claim 1, wherein said rotary knob is rotationally conjointly coupled to said rotatable brake component by said coupling device in such a way that a spatial alignment of said rotary knob and of said rotatable brake component with respect to one another changes during a rotational movement of said rotary knob.

3. The operating device according to claim 1, wherein said coupling device comprises coupling means at said rotary knob and said rotatable brake component.

4. The operating device according to claim 3, wherein said coupling device comprises one or more elements selected from the group consisting of teeth, gear wheels, friction surfaces, belts, chains, gears, and planetary gears.

5. The operating device according to claim 1, wherein internal teeth are formed on an internal contour of said rotary knob and external teeth coupled to said internal teeth are formed on an external contour of said rotatable brake component.

6. The operating device according to claim 1, which comprises electrical cables axially passing through said rotary knob.

7. The operating device according to claim 1, wherein said central part comprises the carrier arm having a first end connected to said base plate, and a second end supporting a carrier part.

8. The operating device according to claim 7, which comprises a user interface received at said carrier part.

9. The operating device according to claim 8, wherein said user interface comprises one or more of an operating panel, a display, a touch-sensitive display with or without haptic feedback, and/or at least one visual camera or a sensor.

10. The operating device according to claim 1, wherein said transfer apparatus has one side with a shaft output and an opposite side with a closed wall.

11. The operating device according to claim 1, wherein said rotary knob comprises two tubular parts that are axially displaceable with respect to one another, said tubular parts being rotationally conjointly coupled to one another by way of coupling pins.

12. The operating device according to claim 1, wherein said rotary knob is axially displaceable.

13. The operating device according to claim 1, wherein said rotary knob is axially displaceable and configured to provide haptic feedback at an end position thereof.

14. The operating device according to claim 1, further comprising at least one sensor associated with said rotary knob for detecting at least one of an axial actuation, an angle change, or an absolute angular position.

15. The operating device according to claim 1, wherein said transfer apparatus comprises a magnetic circuit and a magnetic field generating device with an electric coil, and wherein a magnetorheological medium is disposed in a gap formed between said stationary brake component and said rotational brake component.

16. The operating device according to claim 15, further comprising rotary bodies that are surrounded by the magnetorheological medium and that are disposed between said stationary brake component and said rotational brake component.

17. The operating device according to claim 16, further comprising a control device configured to cause a variable braking effect at said rotary knob by selectively energizing said electric coil.

18. A haptic operating device for a motor vehicle, the haptic operating device comprising:

a base plate;
a stationary central part disposed above said base plate and connected to said base plate by way of a carrier arm;
a hollow rotary knob rotatably mounted about said stationary central part, said hollow rotary knob having an internal diameter, said hollow rotary knob being rotatably mounted about a central rotation axis;
a magnetorheological transfer apparatus for selectively braking a rotational movement of said rotary knob, said transfer apparatus having a braking component that is rotatable relative to said base plate about a rotation axis that is parallel to the central rotation axis and radially offset from the central rotation axis;
a coupling device disposed to couple said rotary knob to said transfer apparatus for conjoint rotation;
said transfer apparatus having an external diameter that is smaller than said internal diameter of said hollow rotary knob; and
said carrier arm and said transfer apparatus being disposed next to one another inside said hollow rotary knob.

* * * * *